US011495864B2

(12) United States Patent
Lee et al.

(10) Patent No.: US 11,495,864 B2
(45) Date of Patent: Nov. 8, 2022

(54) SEPARATOR FOR SECONDARY BATTERY AND ELECTROCHEMICAL DEVICE USING THE SAME

(71) Applicants: SK Innovation Co., Ltd., Seoul (KR); SK IE Technology Co., Ltd., Seoul (KR)

(72) Inventors: Hye Jin Lee, Daejeon (KR); Yun Bong Kim, Daejeon (KR); Min Sang Park, Daejeon (KR); Su Ji Lee, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 264 days.

(21) Appl. No.: 16/857,776

(22) Filed: Apr. 24, 2020

(65) Prior Publication Data
US 2020/0343509 A1   Oct. 29, 2020

(30) Foreign Application Priority Data

Apr. 25, 2019  (KR) .................. 10-2019-0048599

(51) Int. Cl.
| | | |
|---|---|---|
| *H01M 4/66* | (2006.01) | |
| *H01M 4/04* | (2006.01) | |
| *H01M 10/0525* | (2010.01) | |
| *H01M 50/431* | (2021.01) | |
| *H01M 4/02* | (2006.01) | |

(52) U.S. Cl.
CPC ....... *H01M 50/431* (2021.01); *H01M 4/0454* (2013.01); *H01M 4/661* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 8,288,038 B2 | 10/2012 | Kasamatsu et al. | |
| 10,236,490 B2 | 3/2019 | Fang et al. | |
| 10,454,086 B2 | 10/2019 | Jung et al. | |
| 2009/0325064 A1 | 12/2009 | Chang | |

(Continued)

FOREIGN PATENT DOCUMENTS

| | | | |
|---|---|---|---|
| JP | 4664455 B2 | 4/2011 | |
| JP | 4747449 B2 | 8/2011 | |

(Continued)

OTHER PUBLICATIONS

JP2015053180 English translation. Takaoka et al. Japan. Mar. 19, 2015. (Year: 2015).*

*Primary Examiner* — Christopher P Domone
(74) *Attorney, Agent, or Firm* — The Webb Law Firm (57) ABSTRACT

Provided are a separator for a secondary battery and an electrochemical device using the same. More particularly, a composite separator which has a lower Gurley permeability after curing than that before curing when forming a heat-resistant coating layer having low resistance, does not have a Gurley permeability which is greatly increased as compared with the Gurley permeability of a porous substrate itself before forming a coating layer to have an overall low Gurley permeability, and has a high surface hardness to have penetration stability, is provided.

14 Claims, 2 Drawing Sheets

(56) References Cited

U.S. PATENT DOCUMENTS

| | | | | |
|---|---|---|---|---|
| 2012/0219835 A1* | 8/2012 | Kawabe | ............ | H01M 10/0431 |
| | | | | 429/94 |
| 2015/0037652 A1* | 2/2015 | Kim | .................... | H01M 50/403 |
| | | | | 429/144 |
| 2015/0076741 A1* | 3/2015 | Yamada | .............. | H01M 50/423 |
| | | | | 264/406 |
| 2017/0170441 A1* | 6/2017 | Arnold | .................. | B29C 48/022 |

FOREIGN PATENT DOCUMENTS

| | | | |
|---|---|---|---|
| JP | 2011238427 | A | 11/2011 |
| JP | 5126813 | B2 | 1/2013 |
| JP | 2015053180 | * | 3/2015 |
| KR | 1020160041492 | A | 4/2016 |
| KR | 1020160115599 | A | 10/2016 |
| KR | 101754915 | B1 | 7/2017 |
| KR | 1020170083283 | A | 7/2017 |

* cited by examiner

SEPARATOR FOR SECONDARY BATTERY AND ELECTROCHEMICAL DEVICE USING THE SAME

CROSS-REFERENCE TO RELATED APPLICATION

This application claims priority to Korean Patent Application No. 10-2019-0048599 filed Apr. 25, 2019, the disclosure of which is hereby incorporated by reference in its entirety.

TECHNICAL FIELD

The following disclosure relates to a separator for a secondary battery and an electrochemical device using the same. More particularly, the following disclosure relates to a composite separator which has a lower Gurley permeability after curing than that before curing when forming a heat-resistant coating layer having low resistance, does not have a Gurley permeability which is greatly increased as compared with the Gurley permeability of a porous substrate itself before forming a coating layer to have an overall low Gurley permeability, and has a high surface hardness to have penetration stability.

BACKGROUND

In recent years, according to high capacity and high output trends of a secondary battery, there is a growing demand for high strength, high permeability and thermal stability of a separator, and improved characteristics of a separator for electrical safety of a secondary battery during charging and discharging. The lithium secondary battery is required to have high mechanical strength for improving safety in a battery manufacture process and during use of the battery, and to have high permeability and high thermal stability for improving a capacity and output.

For improving the output of the lithium secondary battery, it is important to implement low resistance properties. In addition, it is important to have a porosity at a level at which pore blocking due to swelling of a binder in an electrolyte solution does not occur.

When a water-based ceramic coating is applied on a porous film, the resistance of the secondary battery is increased. In particular, when an aqueous binder is used, the binder enters into pores between inorganic particles, resulting in pore blockage. When pores are blocked, a transfer channel through which lithium ions pass is interfered with to increase resistance.

In addition, there are some problems in a coating method based on a binder composition soluble in an organic solvent when producing a conventional separator including an inorganic material layer. First, a binder soluble in the organic solvent forms a gel as the organic solvent volatilizes in a drying process, thereby generating a solvent-impermeable space, resulting in an unbalanced organic/inorganic coating layer, and this phenomenon may lower battery characteristics. In addition, explosion-proof equipment is needed, and byproducts harmful to the environment or a human body are produced in a working process. Also, there is a problem in that in the state that the binders are dissolved in the organic solvent, pores of the porous polymer substrate are closed.

In order to solve the problem, Korean Patent Laid-Open Publication No. 10-2016-0041492 (Apr. 18, 2016) suggests a method of using a polyvinylidene fluoride dispersion and a water-based slurry including inorganic material particles and organic material particles to form a coating layer on a porous polymer substrate. It is suggested that a separator therefrom has heat resistance with a porous substrate and excellent electrochemical properties, but still lacks battery resistance and stability levels, and thus, an improvement task is urgently needed.

In addition, when a nail or a pin passes through a battery, it may be dangerous due to heat generation and ignition. When a nail or a pin passes through a battery, a separator and an electrode which are constituent elements of a battery are stretched in a certain portion in a penetration direction, and the stretched positive or negative electrode is more likely to directly come into contact with another electrode having a different polarity, and when the direct contact occurs, heat generation and ignition of the entire battery may follow due to a high current flow caused by short circuit between electrodes.

RELATED ART DOCUMENTS

Patent Documents (Patent Literature 1) Korean Patent Laid-Open Publication No. 10-2016-0041492 (Apr. 18, 2016)

SUMMARY

An embodiment of the present invention is directed to providing a composite separator having a low Gurley permeability, a high surface hardness, and excellent electric resistance properties by applying a specialized coating layer on a porous substrate.

In the embodiment of the present invention, a self-crosslinking type water-based latex binder having a high glass transition temperature and an epoxy crosslinking agent are mixed and applied, and it is intended that the Gurley permeability is decreased, and a porosity of an inorganic material coating layer is improved after heat drying to improve a resistance in an electrolyte solution. In addition, in terms of penetration stability, after crosslinking, strength of the binder itself is improved to prevent ignition by short circuit between electrodes.

Another embodiment of the present invention is directed to providing a composite separator having improved safety, which has an excellent surface hardness so that direct contact between electrodes does not occur in a penetration test.

Another embodiment of the present invention is directed to providing a composite separator having an improved hardness and lowered Gurley permeability.

Another embodiment of the present invention is directed to providing a composite separator allowing a battery which has excellent cycle properties by the above merits and may achieve an intended high capacity, to be produced.

Still another embodiment of the present invention is directed to providing a composite separator having a coating layer having a decreased battery resistance and excellent heat resistance.

In one general aspect, a composite separator includes a porous substrate, and a heat-resistant coating layer having low resistance formed on the porous substrate, wherein the heat-resistant coating layer having low resistance is formed by curing an application layer obtained by applying a crosslinkable composition including inorganic particles, an acrylic latex, and a crosslinking agent, the acrylic latex is coated in a film form on a surface of the inorganic particles, and the heat-resistant coating layer having low resistance has a hardness of 0.8 GPa or more at an indentation depth of 50 to 150 nm when a surface hardness is measured using a nanoindenter.

In another general aspect, an electrochemical device includes the composite separator. More specifically, the electrochemical device may be a lithium secondary battery.

Other features and aspects will be apparent from the following detailed description, the drawings, and the claims.

DETAILED DESCRIPTION OF EMBODIMENTS

Hereinafter, the present invention will be described in more detail with reference to specific examples or exemplary embodiments including the accompanying drawings. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain specific example, and not intended to limit the present invention.

In addition, the singular form used in the specification and claims appended thereto may be intended to also include a plural form, unless otherwise indicated in the context.

An embodiment of the present invention is a composite separator including a porous substrate, and a heat-resistant coating layer having low resistance formed on the porous substrate, wherein the heat-resistant coating layer having low resistance is formed by curing an application layer obtained by applying a crosslinkable composition including inorganic particles, an acrylic latex, and a crosslinking agent, the acrylic latex is coated in a film form on a surface of the inorganic particle particles, and the heat-resistant coating layer having low resistance has a hardness of 0.8 GPa or more at an indentation depth of 50 to 150 nm when a surface hardness is measured using a nanoindenter.

The acrylic latex may be coated in a film form on a surface of the inorganic particles. The term, "coated in a film form on a surface of the inorganic particles" means that spherical binder particles are coated in the form of a film on all or part of the surface of the inorganic particle without maintaining the spherical shape of the binder particles. Accordingly, particles of the acrylic latex or an aggregate form of the crosslinkable composition may not be substantially observed.

In an embodiment of the present invention, the composite separator may have a Gurley permeability satisfying the following Equations 1 and 2:

$$G_2 \leq 200 \qquad [\text{Equation 1}]$$

$$G_2 < G_1 \qquad [\text{Equation 2}]$$

wherein $G_2$ is the Gurley permeability of the composite separator measured according to ASTM D726 after curing an application layer obtained by applying the crosslinkable composition at 120° C. for 1 hour, and $G_1$ is the Gurley permeability of the composite separator measured after applying the crosslinkable composition and before curing, unit being sec/100 cc.

In an embodiment of the present invention, the composite separator may have an amount of change in Gurley permeability satisfying the following Equation 3:

$$G_1 - G_2 \leq 100 \qquad [\text{Equation 3}]$$

In an embodiment of the present invention, the composite separator may have an amount of change in Gurley permeability satisfying the following Equation 4:

$$G_2 - G_3 \leq 50 \qquad [\text{Equation 4}]$$

wherein $G_2$ is the Gurley permeability of the composite separator measured according to ASTM D726 after curing an application layer obtained by applying the crosslinkable composition at 120° C. for 1 hour, and $G_3$ is the Gurley permeability of the porous substrate itself, unit being sec/100 cc.

In an embodiment of the present invention, the heat-resistant coating layer having low resistance may have a modulus of 0.3 GPa or more at an indentation depth of 50 to 150 nm when the modulus is measured using a nanoindenter.

The acrylic latex is obtained by reacting an acrylic resin and a melamine-based curing agent or a melamine-formaldehyde-based curing agent in the presence of an amine-based catalyst, and may include a hydroxyl group at the end.

The heat-resistant coating layer having low resistance may include the inorganic particles and the acrylic latex at a weight ratio of 50 to 90:10 to 50.

The acrylic latex may have an average particle diameter of 10 to 300 nm.

The crosslinking agent may be an epoxy-based crosslinking agent.

The content of the crosslinking agent may be 1 to 30 wt % of the content of the acrylic latex.

In an embodiment of the present invention, particles of the acrylic latex or an aggregate form of the crosslinkable composition may not be observed in the heat-resistant coating layer having low resistance by the curing.

Figure 2:
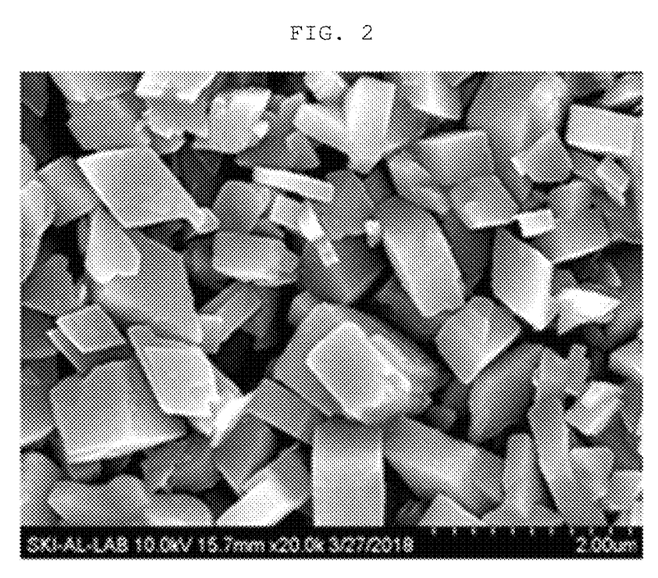
FIG. 2 is an SEM photograph (20K times magnification) of a heat-resistant coating layer having low resistance obtained by heating and curing the application layer obtained by applying the crosslinkable composition according to an exemplary embodiment of the present invention.
Figure 3:
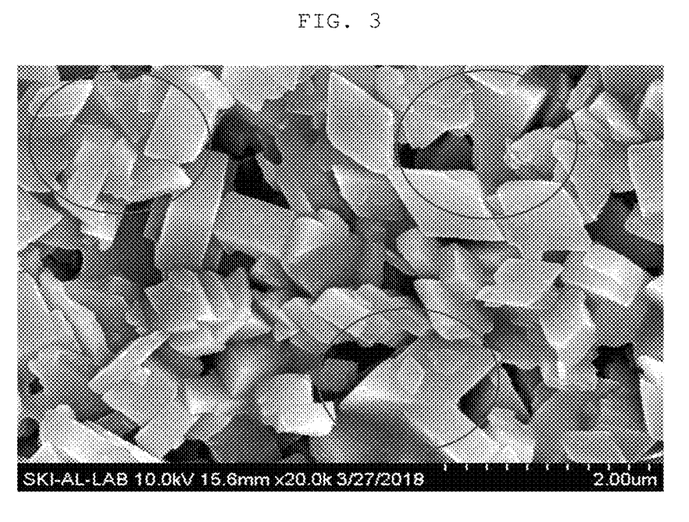
FIG. 3 is an SEM photograph (20K times magnification) of a coating layer formed by forming an application layer using a general water-based latex according to Comparative Example 1 and heating the application layer.

The aggregate may be observed by magnifying the produced composite separator 20K times by SEM, and in the present invention, an empty space is formed between the inorganic particles as shown in FIG. 2. The aggregate means that some aggregated lumps are observed without forming an empty space between the inorganic particles as shown in FIG. 3.

The acrylic latex may be melted and self-crosslinked with the crosslinking agent at 80° C. to 150° C.

The inorganic particles may have an average particle diameter of 1 μm or less.

The inorganic particles may be boehmite.

The heat-resistant coating layer having low resistance may have a thickness of 1 to 10 μm.

Another embodiment of the present invention is an electrochemical device including the composite separator.

In an embodiment of the present invention, the electrochemical device may be a lithium secondary battery.

Hereinafter, each constituent element of the present invention will be described in more detail.

[Porous Substrate]

In an embodiment of the present invention, the porous substrate is not limited as long as it is commonly used as a separator of a secondary battery.

For example, the porous substrate may be formed of a woven fabric, a nonwoven fabric, a porous film, or the like. The material of the porous substrate is not limited, but specifically, for example, may be formed of any one selected from the group consisting of polyethylene, polypropylene, polybutylene, polypentene, polymethylpentene, polyethylene terephthalate, polybutylene terephthalate, polyacetal, polyamide, polycarbonate, polyimide, polyethersulfone, polyphenylene oxide, polyphenylene sulfide, polyethylene naphthalene, a copolymer thereof, and the like, or a mixture of two or more thereof.

The thickness of the porous substrate is not limited, and may be usually 1 to 100 µm, specifically 5 to 50 µm, and more preferably 6 to 30 µm, which are ranges used in the art.

In an embodiment of the present invention, the porous substrate may have a Gurley permeability of 200 sec/100 cc or less, specifically 150 sec/100 cc or less, and more specifically 100 sec/100 cc or less, since a composite separator having excellent air permeability, having a total Gurley permeability of 200 sec/100 cc after forming the heat-resistant coating layer having low resistance, may be provided.

[Heat-Resistant Coating Layer Having Low Resistance]

The composite separator of the present invention has both a high heat resistance and a high surface hardness, does not cause ignition in a penetration test, and has a low Gurley permeability, by forming the heat-resistant coating layer having low resistance, so that resistance during battery assembly is greatly decreased.

In an embodiment of the present invention, the heat-resistant coating layer having low resistance may be formed by curing an application layer obtained by applying a crosslinkable composition including inorganic particles, an acrylic latex, and a crosslinking agent. Here, the acrylic latex and the crosslinking agent are cured and melted to have a film form coated and adsorbed on the surface of inorganic particles. More specifically, the heat-resistant coating layer having low resistance may be coated in a film form on the surface of the inorganic particles, and the expression, "coated in a film form on the surface of the inorganic particles" means that spherical binder particles are coated in the form of a film on all or part of the surface of the inorganic particles without maintaining the spherical shape of the binder particles. Accordingly, particles of the acrylic latex or an aggregate form of the crosslinkable composition may not be substantially observed in the heat-resistant coating layer having low resistance by the curing. The aggregate may be observed by measuring SEM and magnifying the SEM 20K times, and it may be observed that the inorganic particles are not aggregated and there is an empty space between the inorganic particles.

Accordingly, an unprecedented phenomenon in which the Gurley permeability is rather further decreased as compared with the Gurley permeability before curing may be expressed. This phenomenon is unusual and contrasted since common organic particles made of a polymer are melted upon heating to form an aggregate, thereby increasing the Gurley permeability after heating. That is, when the heat-resistant coating layer having low resistance of the present invention is formed, the composite separator has a low Gurley permeability to have excellent air permeability, a high hardness so that a surface hardness is 0.8 GPa or more as measured using a nanoindenter, and excellent heat resistance.

In an embodiment of the present invention, the application layer obtained by applying the crosslinkable composition including the inorganic particles, the acrylic latex, and the crosslinking agent is cured to crosslink the acrylic latex and the crosslinking agent, so that the heat-resistant coating layer having low resistance is coated in a film form on the surface of the inorganic particles.

Figure 1:
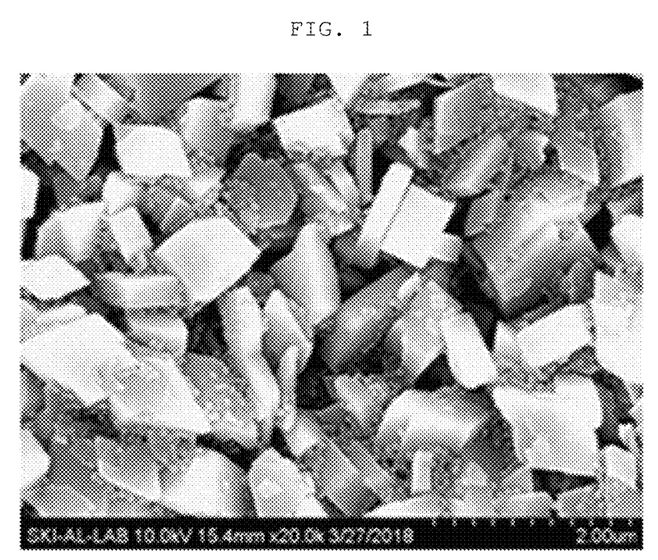
FIG. 1 is an SEM photograph (20K times magnification) of an application layer obtained by applying a crosslinkable composition according to an exemplary embodiment of the present invention.

Specific examples will be provided using FIGS. 1 and 2, for example. FIG. 1 is a photograph of the application layer obtained by applying the crosslinkable composition, and as shown from FIG. 1, it is confirmed that the acrylic latex is present in a spherical shape. FIG. 2 is a photograph of the heat-resistant coating layer having low resistance obtained by heating and curing the application layer obtained by applying the crosslinkable composition, and as shown in FIG. 2, the acrylic latex and the crosslinking agent are melted and crosslinked after heating and curing, and the acrylic latex is self-crosslinked to be coated and adsorbed in a film form on the surface of the inorganic particles, so that particles of the acrylic latex in a spherical shape are not seen and there is an empty space between the inorganic particles. In this regard, FIG. is an SEM photograph (20K times magnification) of a coating layer formed by forming an application layer using a general water-based latex and heating the application layer. As shown in the part marked with a red circle, it is recognized that an aggregate is formed between the inorganic particles.

In addition, it is confirmed that when the Gurley permeability of the application layer obtained by applying the crosslinkable composition is measured, the Gurley permeability is rather decreased after curing as compared with the Gurley permeability before curing, and thus, it is recognized that the acrylic latex is coated and adsorbed on the surface of the inorganic particles. Accordingly, as compared with the Gurley permeability measured after applying the crosslinkable composition and before curing, the Gurley permeability measured after curing is further decreased, thereby providing a composite separator having further improved air permeability after curing.

In an embodiment of the present invention, the composite separator may have a Gurley permeability satisfying the following Equations 1 and 2:

$$G_2 \leq 200 \quad \text{[Equation 1]}$$

$$G_2 < G_1 \quad \text{[Equation 2]}$$

wherein $G_2$ is the Gurley permeability of the composite separator measured according to ASTM D726 after curing an application layer obtained by applying the crosslinkable composition at 120° C. for 1 hour, and $G_1$ is the Gurley permeability of the composite separator measured after applying the crosslinkable composition and before curing, unit being sec/100 cc.

In Equations 1 and 2, $G_2$ may be 200 sec/100 cc or less, specifically 100 to 200 sec/100 cc, more specifically 120 to 190 sec/100 cc, and still more specifically 150 to 180 sec/100 cc. Within the range, the air permeability is excellent, battery resistance is further decreased, and electrochemical stability is excellent, which is thus preferred. Specifically, an excellent effect that the battery resistance is 700 mΩ or less, more preferably 690 mΩ or less, and 100 cycle life retention rate at the time of battery life characteristic evaluation is 90% or more, more preferably 95% or more, may be achieved.

In addition, as seen from Equation 2, in the composite separator according to an embodiment of the present invention, the application layer obtained by applying the crosslinkable composition including the inorganic particles, the acrylic latex, and the crosslinking agent is heated and cured, so that the acrylic latex and the crosslinking agent are cured and melted, and coated on the surface of the inorganic particles, and thus, the permeability tends to be rather decreased after heating and curing.

More specifically, the composite separator may have an amount of change in Gurley permeability satisfying the following Equation 3:

$$G_1 - G_2 \leq 100 \quad \text{[Equation 3]}$$

wherein $G_2$ is the Gurley permeability of the composite separator measured according to ASTM D726 after curing the application layer obtained by applying the crosslinkable composition at 120° C. for 1 hour, and $G_1$ is the Gurley permeability of the composite separator measured after applying the crosslinkable composition and before curing, unit being sec/100 cc.

Specifically, in Equation 3, $G_1 - G_2$ may be 100 sec/100 cc or less, specifically for example, 1 to 100 sec/100 cc, 2 to 90 sec/100 cc, more specifically 5 to 80 sec/100 cc, and more specifically 10 to 50 sec/100 cc.

This is completely different physical property from an increased permeability by aggregation of organic particles after heating, in the case of using common organic particles.

In addition, the composite separator may have an amount of change in Gurley permeability satisfying the following Equation 4:

$$G_2 - G_3 \leq 50 \quad \text{[Equation 4]}$$

wherein $G_2$ is the Gurley permeability of the composite separator measured according to ASTM D726 after curing an application layer obtained by applying the crosslinkable composition at 120° C. for 1 hour, and $G_3$ is the Gurley permeability of the porous substrate itself, unit being sec/100 cc.

More specifically, in Equation 4, $G_2 - G_3$ may be 50 sec/100 cc or less, specifically 1 to 50 sec/100 cc, and more specifically 10 to 30 sec/100 cc.

In addition, a rate of change in Gurley permeability represented by the following Equation 5 may be 10% or less. More specifically, the rate of change in Gurley permeability may be 1 to 10%.

$$(G_1 - G_2)/G_1 \times 100 \quad \text{[Equation 5]}$$

wherein $G_2$ is the Gurley permeability of the composite separator measured according to ASTM D726 after curing the application layer obtained by applying the crosslinkable composition at 120° C. for 1 hour, and $G_1$ is the Gurley permeability of the composite separator measured after applying the crosslinkable composition and before curing, unit being sec/100 cc.

In addition, in the composite separator according to an embodiment of the present invention, the heat-resistant coating layer having low resistance has a high hardness of 0.8 GPa or more, specifically 0.8 to 1.1 GPa, and more specifically 0.85 to 0.95 GPa at an indentation depth of 50 to 150 nm, when a surface hardness is measured using a nanoindenter. Within the range, battery stability may be provided so that ignition does not occur in a penetration test.

The surface hardness is measured at a point that is 50 to 150 nm from a coating surface in a thickness direction, using a nanoindenter (MTS (U.S.A.), Nano Indenter XP). The result at a deeper indentation depth was considered as the characteristics of the porous substrate or the inorganic material. In addition, for more accurate evaluation, it is preferred that the surface hardness is measured by measuring hardnesses at 9 points in an area of 100 μm×100 μm, removing noise values due to the inorganic material, and averaging the values.

The Gurley permeability and the surface hardness as described above are likely to result from the characteristics of the acrylic latex used as organic particles in an embodiment of the present invention.

In an embodiment of the present invention, the acrylic latex is a water dispersion in which nano-sized acrylic particles are dispersed, and includes a thermoplastic or thermocurable acrylic resin and a curing agent. More specifically, the acrylic latex is one-liquid type, may be obtained by reacting an acrylic resin and a melamine-based curing agent or a melamine-formaldehyde-based curing agent in the presence of an amine-based catalyst, and includes a hydroxyl group at the end. By the hydroxyl group at the end, water dispersion and a self-crosslinking reaction may be performed.

The melamine-based curing agent may be a melamine-based compound, a polyaldehyde compound, or a paraformaldehyde compound. More specifically, a melamine-based compound may be used, and specifically for example, hexamethylolmelamine, hexamethoxymethylolmelamine, a compound in which 1 to 6 methylol groups of hexamethylolmelamine are methoxymethylated, or a mixture thereof, hexamethoxyethylmelamine, hexaacyloxymethylmelamine, a compound in which 1 to 6 methylol groups of hexamethylolmelamine are acyloxymethylated, or a mixture thereof, and the like may be used.

The acrylic latex including the melamine-based curing agent may be self-crosslinked in the presence of a catalyst, more specifically an acid catalyst. Specifically, a temperature at which self-crosslinking is performed is 120° C. or higher in the presence of a catalyst, and in the case of absence of the catalyst, the self-crosslinking reaction may proceed at a temperature of 150° C. or higher. As the catalyst for performing the self-crosslinking reaction, an acid catalyst may be used, and specifically for example, p-toluene sulfonic acid (p-TSA) or the like may be used, but is not limited thereto. A content of the acid catalyst may be 0.5 to 1.5 wt %, based on a content of the acrylic latex including the melamine-based curing agent. When the acid catalyst is not used, the crosslinking reaction may proceed by increasing a reaction time at 80 to 120° C. Specifically for example, the crosslinking reaction is performed at 120° C. for 1 hour or more, whereby a unit derived from the melamine-based curing agent or the formaldehyde-based curing agent participates in the crosslinking reaction, causing the hardness of the coating layer to be increased.

A commercialized example of the acrylic latex including the melamine-based curing agent may include PRIMAL™ 3208 (solid content of 44 wt %) available from Rohm and Haas, and the like, but is not limited thereto.

The acrylic latex including the melamine-based curing agent is water-dispersed in water to maintain the spherical shape.

The acrylic latex including the melamine-based curing agent may have a glass transition temperature of 40 to 60° C., specifically 45 to 55° C.

The acrylic latex including the melamine-based curing agent may have an average particle diameter of 10 to 300 nm, specifically 50 to 250 nm, and more specifically 90 to 150 nm. Within the range, it is easy to perform coating on the surface of the inorganic particles at the time of heating and curing, which is thus preferred.

The acrylic latex including the melamine-based curing agent may be included at 0.8 to 5 g/m$^2$, more specifically 1 to 3 g/m$^2$ in the heat-resistant coating layer having low resistance. When a content of the organic particles is within the range, the Gurley permeability may be lowest, which is thus preferred.

The acrylic latex including the melamine-based curing agent may be included at 10 to 50 wt %, more specifically 20 to 30 wt %, based on 100 wt % of the total solid content used in the heat-resistant coating layer having low resistance. Within the range, adhesive strength and coating stability are sufficiently expressed.

In addition, the acrylic latex including the melamine-based curing agent may satisfy the physical property of a rate of change in weight according to the following Equation 6 of less than 50%, specifically 1 to 49%, and more specifically 10 to 40%, when the acrylic latex is impregnated with an electrolyte solution. Accordingly, the composite separator including the heat-resistant coating layer having low resistance according to an embodiment of the present invention may prevent swelling or decomposition by an electrolyte solution, when an electrolyte solution is injected after producing an electrode assembly.

Accordingly, when the composite separator according to an embodiment of the present invention is applied, a phenomenon of swelling or decomposition by an electrolyte solution is significantly decreased, thereby further improving the cycle properties and the resistance properties of a battery.

When the rate of change in weight is 50% or more, it was found that an initial life was very short when the battery life characteristics are measured.

The rate of change in weight is measured as follows. The acrylic latex including the melamine-based curing agent used in the heat-resistant coating layer having low resistance of the present invention is put in a Teflon petri dish, water was evaporated at 60° C. for one day to produce a film, 1 g of the film was soaked in an electrolyte solution and allowed to stand for 3 days, the electrolyte solution was poured out, and the weight of the film was measured to calculate the rate of change in weight.

Rate of change in weight=$(W2-W1)/W1 \times 100$ [Equation 6]

wherein W2 is a weight measured after impregnating the acrylic latex with an electrolyte solution for 3 days, and W1 is a weight measured before impregnating the acrylic latex with the electrolyte.

Here, as the electrolyte solution, any electrolyte solution may be used without limitation as long as it is commonly used in the art, and for example, any one selected from organic solvents such as carbonate-based solvents, nitrile-based solvents, ester-based solvents, ether-based solvents, ketone-based solvents, glyme-based solvents, alcohol-based solvents, and aprotic solvents, and water, or a mixed solvent of two or more thereof may be used. In addition, the solvent may further include a lithium salt.

The carbonate-based solvent may be any one selected from ethylene carbonate, propylene carbonate, butylene carbonate, ethylmethyl carbonate, ethylpropyl carbonate, methylpropyl carbonate, dimethyl carbonate, diethyl carbonate, dipropyl carbonate, and the like, or a mixture of two or more thereof, but is not limited thereto.

The nitrile-based solvent may be any one selected from acetonitrile, succinonitrile, adiponitrile, sebaconitrile, and the like, or a mixture of two or more thereof, but is not limited thereto.

The ester-based solvent may be any one selected from methyl acetate, ethyl acetate, n-propyl acetate, 1,1-dimethylethyl acetate, methyl propionate, ethyl propionate, γ-butyrolactone, decanolide, valerolactone, mevalonolactone, caprolactone, and the like, or a mixture of two or more thereof, but is not limited thereto.

The ether-based solvent may any one selected from dimethyl ether, dibutyl ether, tetraglyme, diglyme, dimethoxyethane, 2-methyltetrahydrofuran, tetrahydrofuran, and the like, or a mixture of two or more thereof, but is not limited thereto.

The ketone-based solvent may be cyclohexanone and the like.

The glyme-based solvent may be any one selected from ethylene glycol dimethylether, triethylene glycol dimethyl ether, tetraethylene glycol dimethyl ether, and the like, or a mixture of two or more thereof, but is not limited thereto.

The alcohol-based solvent may be ethylalcohol, isopropylalcohol, and the like, and the aprotic solvent may be nitriles such as R—CN (R is a linear, branched or cyclic C2 to C20 hydrocarbon group, and may include a double bond aromatic ring or an ether bond), amides such as dimethylformamide, dioxolanes such as 1,3-dioxolane, sulfolanes, and the like.

The lithium salt may be any one selected from lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bisoxalatoborate ($LiB(C_2O_4)_2$), lithium trifluoromethanesulfonylimide ($LiN(C_xF_{2x+1}SO_2)(C_yF_{2y+1}SO_2)$) (wherein x and y are a natural number), and derivatives thereof, or a mixture of two or more thereof. A concentration of the lithium salt may be 0.1 to 10.0 M, more specifically 1 to 10 M, but is not limited thereto.

More specifically, for example, the electrolyte may be a mixture of ethylene carbonate, ethylmethyl carbonate, and dimethyl carbonate at a volume ratio of 3:5:2.

In an embodiment of the present invention, as the inorganic particle, specifically for example, boehmite, calcium carbonate, talc, clay, kaolin, silica, hydrotalcite, diatomite, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, glass, and the like may be used, and also, as the inorganic particles having a dielectric constant of 5 or more, any one selected from $SrTiO_3$, $SnO_2$, $CeO_2$, MgO, NiO, CaO, ZnO, $ZrO_2$, $Y_2O_3$, $Al_2O_3$, $TiO_2$, SiC, or the like, or a mixture of two or more thereof may be used. In addition, as the inorganic material particles having piezoelectricity, any one selected from $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), or the like, or a mixture of two or more thereof may be used. In addition, as the inorganic material particles having lithium ion transfer ability, any one selected from lithium phosphate ($Li_3PO_4$), lithium titanium phosphate (LixTiy$(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$ series glass (0<x<4, 0<y<13), lithium lanthane titanate ($Li_xLa_yTiO_3$, 0<x<2, 0<y<3), lithium geranium thiophosphate ($Li_xGe_yP_zS_w$, $0<x<4$, $0<y<1$, $0<z<1$, $0<w<5$), lithium nitrite ($Li_xN_y$, $0<x<4$, $0<y<2$), $SiS_2$ ($Li_xSi_yS_z$, $0<x<3$, $0<y<2$, $0<z<4$) series glass, $P_2S_5$ ($Li_xP_yS_z$, $0<x<3$, $0<y<3$, $0<z<7$) series glass, or the like, or a mixture of two or more thereof may be used. When the inorganic material particles having a high dielectric constant, the inorganic material particles having piezoelectricity, and the inorganic material particles having lithium ion transfer ability are used in combination, the synergistic effect thereof may double.

More preferably, boehmite may be used, and when the boehmite is used, battery expansion and a separator release phenomenon by surface friction are significantly improved, which is thus further preferred. In addition, boehmite is more economical than alumina and is preferred in terms of reducing wear of coating equipment.

The size of the inorganic particles is not limited, but the average particle diameter may be 1 μm or less, more specifically 0.001 to 1 μm, more specifically 0.01 to 0.9 μm, more specifically 0.1 to 0.85 μm, and still more preferably 0.5 to 0.8 μm, and within the range, an appropriate porosity may be used, which is thus preferred.

The content of the inorganic particles is not limited, but may be 50 to 90 wt %, more specifically 60 to 80 wt %, based on 100 wt % of the total solid content used in the heat-resistant coating layer having low resistance. Within the range, heat resistance to be desired is sufficiently achieved.

The inorganic particles may be included at 0.8 to 10 $g/m^2$, more specifically 2 to 8 $g/m^2$ in the heat-resistant coating layer having low resistance. When the content of the inorganic particles is within the range, change in the Gurley permeability may be minimized.

In an embodiment of the present invention, the crosslinking agent is not limited as long as it crosslinks the acrylic latex, and the crosslinking agent may be a thermal crosslinking agent. The crosslinking agent performs further crosslinking in addition the self-crosslinking of the acrylic latex, thereby providing a separator having a higher surface hardness and a lower Gurley permeability, and thus, may express effects of low battery resistance, stability in a nail penetration test, and excellent battery life characteristics.

Specifically for example, an epoxy-based crosslinking agent may be used. The epoxy-based crosslinking agent may be any one selected from ethylene glycol diglycidyl ether, diethylene glycol diglycidyl ether, polyethylene glycol diglycidyl ether, propylene glycol diglycidyl ether, glycerol polyglycidyl ether, polyglycerol polyglycidyl ether, diglycerol polyglycidyl ether, and sorbitol polyglycidyl ether, or a mixture of two or more thereof. In addition, the content of the crosslinking agent may be 1 to 30 wt % of the content of the acrylic latex including the melamine-based curing agent. More specifically, the crosslinking agent may be used at 5 to 25 wt %. Within the range, a coating layer having an excellent hardness may be formed, which is thus preferred.

In an embodiment of the present invention, the heat-resistant coating layer having low resistance is formed by forming an application layer obtained by applying a crosslinkable composition which is a water-based slurry including inorganic particles, an acrylic latex including a melamine-based curing agent, a crosslinking agent, and water, and heating and curing the application layer, and the solid content of the particles in the water-based slurry may be 1 to 30 wt %. That is, particles in which the inorganic particles and the acrylic latex including the melamine-based curing agent are mixed at a weight ratio of 50 to 90:10 to 50 may be included at 10 to 50 wt % in the water-based slurry.

In an embodiment of the present invention, the acrylic latex including the melamine-based curing agent is crosslinked and melted with the crosslinking agent at 80 to 120° C., self-crosslinked, and coated in a film form on the surface of the inorganic particles. Accordingly, after the crosslinkable composition is applied to form the application layer, heating and curing may be performed at 80 to 120° C. Within the temperature range, a heat-resistant coating layer having low resistance having a better hardness may be formed, which is thus preferred. Though it is not limited thereto, the heating and curing may be performed preferably at 80 to 120° C. for 30 minutes to 2 hours.

In an embodiment of the present invention, the heat-resistant coating layer having low resistance may be formed on the porous substrate, and specifically for example, may be formed on one surface or both surfaces of the porous substrate.

In an embodiment of the present invention, the heat-resistant coating layer having low resistance may have a thickness of 1 to 10 μm, more specifically 2 to 8 μm, and more specifically 3 to 5 μm. Though it is not limited thereto, within the range, it is appropriate to achieve the rate of change in Gurley permeability to be desired.

In an embodiment of the present invention, the composite separator may have a hardness of 0.8 GPa or more, more specifically 0.8 to 1.0 GPa at an indentation depth of 50 to 150 nm when a surface hardness is measured using a nanoindenter. The indentation depth is a point that is 50 to 150 nm from the surface in a thickness direction at which the hardness is measured, and the reason why the point is 50 to 150 nm from the surface is that on the surface, a deviation is severe due to a surface roughness. Within the range satisfying the hardness, for a separator having improved stability and a secondary battery including the separator, more specifically, at a higher hardness, a penetration resistance to a nail is increased, thereby securing internal short circuit safety of a secondary battery, which is thus preferred.

In penetration evaluation, a secondary battery is fixed to a test device to measure the temperature and the voltage of a secondary battery, a sharp metal nail having a diameter of 3 mm (SK3-JIS, Japan) is passed through the secondary battery at a speed of 80 m/sec to intentionally cause short circuit inside the secondary battery, a temperature or voltage change is measured, and it may be visually confirmed whether the secondary battery ignites.

In addition, a modulus may be 0.3 GPa or more, specifically 0.3 to 1.0 GPa at an indentation depth of 50 to 150 nm when the modulus is measured using a nanoindenter. Within the range, a penetration significant difference may be confirmed more clearly. A high modulus is caused by a high crosslink density. However, since an excessively high crosslink density rather increases resistance, penetration stability and decreased battery resistance with the increased modulus by the increased crosslink density are optimal conditions, which are thus preferred.

[Production Method]

In an embodiment of the present invention, a method of forming the heat-resistant coating layer having low resistance may be applying a crosslinkable composition including inorganic particles, an acrylic latex, and a crosslinking agent on a porous substrate to form an application layer, and curing the application layer so that the acrylic latex and the crosslinking agent are cured and melted, thereby forming the heat-resistant coating layer having low resistance coated on the surface of the inorganic particles. More specifically, the curing may be heat curing.

The coating method is not limited, and specifically for example, it may be a common coating method such as bar coating, dip coating, and spray coating.

In the process of heating and curing after coating, the temperature may be a temperature at which the acrylic latex and the crosslinking agent are crosslinked and self-crosslinked to be coated in a film form on the surface of the inorganic particles, and may be specifically 80 to 150° C., preferably 80 to 120° C. In addition, as a curing time is increased, a surface hardness may be further increased, and though it is not limited thereto, by performing curing for 30 minutes to 2 hours, a coating layer having an excellent surface hardness may be formed.

The heat curing may be performed after drying, or the heat curing may be performed alone. When the heat curing is performed within the range, the coating layer is uniformly cured without affecting the physical properties of the porous substrate, thereby preventing poor coating, which is thus preferred. The step of heat curing is a step of drying water of the water-based slurry formed on the porous substrate and inducing a curing reaction of the heat curing agent, thereby finally forming the coating layer.

Hereinafter, the present invention will be described in more detail with reference to the Examples and Comparative Examples. However, the following Examples and Comparative Examples are only an example for describing the present invention in detail, and do not limit the present invention in any way.

1. Gurley Permeability

As a gas permeability, a Gurley permeability was measured. It was measured according to the standard of ASTM D726, using Densometer available from Toyoseiki. How long it takes for 100 cc of air to pass a separator having an area of 1 inch$^2$ was recorded in seconds and compared.

2. Surface Hardness and Modulus

A surface hardness of a composite separator was measured using a nanoindenter (MTS (U.S.A), Nano Indenter XP).

More accurately, for the same sample, the surface hardness was compared as an average value obtained by measuring hardnesses at 9 points in an area of 100 μm×100 μm, removing noise values due to an inorganic material, and averaging the values.

A modulus(elastic modulus) was measured at a point that is 50 to 150 nm from the surface.

3. Battery Resistance

1) Production of Positive Electrode 94 wt % of $LiCoO_2$ as a positive electrode active material, 2.5 wt % of polyvinylidene fluoride as a fusing agent, and 3.5 wt % of carbon black as a conductive agent were added to N-methyl pyrrolidone as a solvent so that a solid content is 50 wt %, and the solution was stirred to produce a uniform positive electrode slurry. The positive electrode slurry was coated on an aluminum foil having a thickness of 30 μm, dried, and pressed to produce a positive electrode plate having a thickness of 150 μm.

2) Production of Negative Electrode 95 wt % of artificial graphite as a negative electrode active material, 3 wt % of an acrylic latex having $T_g$ of −52° C. as a fusing agent, and 2 wt % of carboxymethyl cellulose as a thickening agent were added to water as a solvent so that a solid content is 48 wt %, and the solution was stirred to produce a uniform negative electrode slurry. The negative electrode slurry was coated on a copper foil having a thickness of 20 μm, dried, and pressed to produce a negative electrode plate having a thickness of 150 μm.

The composite separator produced in the Examples and the Comparative Examples were used between the positive electrode and the negative electrode as produced above to assemble a pouch type battery in a stacking manner, and an electrolyte solution (6 g) in which lithium hexafluorophosphate ($LiPF_6$) was dissolved in 1 M in a mixed solution of ethylene carbonate, ethylmethyl carbonate, and diethyl carbonate at a volume ratio of 25:45:30, was injected to produce a lithium secondary battery.

4. Battery Life Characteristics

Cycle evaluation was performed by charging and discharging each battery produced by the above assembly process 500 times at a discharge rate of 1 C, and then measuring a discharge capacity to measure a decreased degree of capacity relative to the initial capacity.

Initial battery life plunge means that a capacity retention rate falls by 20% or more within 50 cycles.

5. Penetration Test

A battery was assembled using the composite separators produced in the Examples and the Comparative Examples, charged to 80% under a voltage of 4.2V, and penetrated at the center of the battery at a speed of 80 m/sec using a nail having a diameter of 3 mm, and it was observed whether the battery was ignited. A total of three samples were prepared, and the number of exploded batteries among them was evaluated.

L1: no change, L2: slightly heated, L3: leaked, L4: fumed, and L5: ignited, in which L1 to L3 were judged as Pass, and L4 and L5 were judged as Fail.

There was no ignition in the Examples as a result of the penetration test, in spite of a charge to SOC 80% (temperature 49.4° C.), and thus, penetration safety (L3) was confirmed.

Example 1

<Production of Slurry for Heat-Resistant Coating Having Low Resistance (Crosslinkable Composition)>

A mixture of boehmite particles having an average particle diameter of 0.7 μm and an acrylic latex (ROHM & HASS, PRIMAL™ 3208, solid content of 44 wt %) at a weight ratio of 90:10 was used, an epoxy-based crosslinking agent(Nagase Chemtech Corp., DENACOL EX-614B) was added at 20 wt % of the content of a latex binder, and the mixture was diluted with water so that a total solid content was 32 wt %, thereby producing a crosslinkable composition.

As the acrylic latex, an acryl latex including a melamine-based curing agent having an average particle diameter of 120 nm and a glass transition temperature of 48° C. (ROHM & HASS, PRIMAL™ 3208, solid content of 44 wt %) was used.

<Production of Composite Separator>

The crosslinkable composition was coated on two surfaces of a polyethylene-based porous substrate having a Gurley permeability of 150 sec/100 cc and a thickness of 9 μm (SK Innovation, ENPASS) using a slot coating die to form an application layer. The coating was performed at a speed of 10 m/min, and the application layer was passed through a dryer having a length of 6 m with hot air at 50° C. coming out, and wound in a roll shape. After winding, the layer was thermally cured at 120° C. for 1 hour, and the total thickness of the composite separator including the heat-resistant coating layer having low resistance formed by curing the application layer was 11 μm. The physical properties of the produced composite separator were measured, and are shown in the following Table 1.

As shown in FIG. 1, before curing, there was the acrylic latex including the spherical melamine-based curing agent on the application layer, but as shown in FIG. 2, after curing, it was confirmed that the acrylic latex including the melamine-based curing agent and the crosslinking agent were melted on the inorganic particles and self-crosslinked, and coated in a film form on the surface of the inorganic particles, so that no spherical particle was seen.

In addition, the Gurley permeability was 182 sec/100 cc before curing, but further decreased to 170 sec/100 cc after curing. A rate of change in Gurley permeability was −6.6%.

Examples 2 and 3

The process was performed in the same manner as in Example 1, except that the contents of the inorganic particles and the acrylic latex were changed as shown in the following Table 1.

Comparative Example 1

The process was performed in the same manner as in Example 1, except that an acrylic latex which was not reacted with the melamine-based curing agent (acrylic latex having a glass transition temperature of 45° C. and a particle size of 120 nm, produced using acryl ester) was used instead of the acryl latex including the melamine-based curing agent, and the epoxy crosslinking agent was not used.

Comparative Example 2

The process was performed in the same manner as in Example 1, except that the acrylic latex used in Comparative Example 1 and a polyvinyl alcohol (PVA) binder were mixed in the same amount and used.

Comparative Example 3

The process was performed in the same manner as in Example 1, except that the same binder as Example 1 was used, and the epoxy-based crosslinking agent was not used.

The crosslinkable compositions used in the above Examples and Comparative Examples were summarized and are shown in Table 1, and the physical properties of the composite separators produced in the Examples and Comparative Examples were evaluated and are shown in the following Table 2.

TABLE 1

| | | Example 1 | Example 2 | Example 3 | Comparative Example 1 | Comparative Example 2 | Comparative Example 3 |
|---|---|---|---|---|---|---|---|
| Acrylic latex | Particle size (nm) | 120 | 120 | 120 | 120 | 120 | 120 |
| | Tg(° C.) | 48 | 48 | 48 | 45 | 80 | 48 |
| | Type | Acrylic latex reacted with melamine-based curing agent | Acrylic latex reacted with melamine-based curing agent | Acrylic latex reacted with melamine-based curing agent | Acrylic latex | Acrylic latex/PVA binder | Acrylic latex reacted with melamine-based curing agent |
| | Content (weight ratio) | 10 | 50 | 30 | 10 | 10 | 10 |
| Inorganic particles | Content (weight ratio) | 90 | 50 | 70 | 90 | 90 | 90 |
| Crosslinking agent | Type | Epoxy-based crosslinking agent | Epoxy-based crosslinking agent | Epoxy-based crosslinking agent | No crosslinking agent | Epoxy-based crosslinking agent | No crosslinking agent |

TABLE 2

| | Example 1 | Example 2 | Example 3 | Comparative Example 1 | Comparative Example 2 | Comparative Example 3 |
|---|---|---|---|---|---|---|
| Gurley permeability (sec/100 cc) of porous substrate | 150 | 150 | 150 | 150 | 150 | 150 |
| Gurley permeability (sec/100 cc) before curing | 182 | 200 | 195 | 242 | 298 | 238 |
| Gurley permeability (sec/100 cc) after curing | 170 | 192 | 180 | 260 | 323 | 250 |
| Hardness (GPa) at depth of 108 nm | 0.9290 | 0.8350 | 0.8910 | 0.5748 | 0.7530 | 0.6985 |

TABLE 2-continued

|  | Example 1 | Example 2 | Example 3 | Comparative Example 1 | Comparative Example 2 | Comparative Example 3 |
|---|---|---|---|---|---|---|
| Modulus (GPa) at depth of 150 nm | 0.3511 | 0.3510 | 0.3560 | 0.3504 | 0.4445 | 0.3820 |
| Electrical resistance (DCIR mΩ) | 698 | 700 | 699 | 755 | 854 | 720 |
| Battery life characteristics | 100-Cycle life retention rate of 97% | 100-Cycle life retention rate of 95% | 100-Cycle life retention rate of 96% | 100-Cycle life retention rate of 80% | 100-Cycle life retention rate of 75% | 100-Cycle life retention rate of 85% |
| Results of nail penetration | SOC 80% Pass | SOC 80% Pass | SOC 80% Pass | SOC 80% Fail | SOC 90% Pass | SOC 80% Fail |

According to an embodiment of the present invention, a composite separator for a secondary battery having an excellent surface hardness and has excellent stability so that ignition does not occur in a penetration test, may be provided.

In addition, the separator has a low Gurley permeability to have an excellent air permeability, and a battery produced therefrom has a greatly decreased resistance.

In addition, according to an embodiment of the present invention, a composite separator allowing a battery which has excellent cycle properties and may achieve an intended high capacity, to be produced, may be provided.

In addition, according to an embodiment of the present invention, the composite separator having excellent heat resistance, may be provided.

Hereinabove, although the present invention has been described by specific matters, and limited exemplary embodiments and drawings, they have been provided only for assisting in the entire understanding of the present invention. Therefore, the present invention is not limited to the exemplary embodiments, and various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A composite separator comprising a porous substrate and a heat-resistant coating layer formed on the porous substrate, wherein
   the heat-resistant coating layer is formed by curing an application layer obtained by applying a crosslinkable composition including inorganic particles, an acrylic latex, and an epoxy-based crosslinking agent,
   the acrylic latex is coated in a film form on a surface of the inorganic particles, and
   the heat-resistant coating layer has a hardness of 0.8 GPa or more at an indentation depth of 50 to 150 nm when a surface hardness is measured using a nanoindenter;
   wherein the acrylic latex is obtained by reacting an acrylic resin and a melamine-based curing agent or a melamine-formaldehyde-based curing agent in the presence of an amine-based catalyst, and includes a hydroxyl group at the end.

2. The composite separator of claim 1, wherein the composite separator has a Gurley permeability satisfying the following Equations 1 and 2:

$$G_2 \leq 200 \quad \text{[Equation 1]}$$

$$G_2 < G_1 \quad \text{[Equation 2]}$$

wherein $G_2$ is the Gurley permeability of the composite separator measured according to ASTM D726 after curing the application layer obtained by applying the crosslinkable composition at 120° C. for 1 hour, and $G_1$ is the Gurley permeability of the composite separator measured after applying the crosslinkable composition and before curing, unit being sec/100 cc.

3. The composite separator of claim 2, wherein the composite separator has an amount of change in Gurley permeability satisfying the following Equation 3:

$$G_1 - G_2 \leq 100. \quad \text{[Equation 3]}$$

4. The composite separator of claim 2, wherein the composite separator has an amount of change in Gurley permeability satisfying the following Equation 4:

$$G_2 - G_3 \leq 50 \quad \text{[Equation 4]}$$

wherein $G_2$ is the Gurley permeability of the composite separator measured according to ASTM D726 after curing the application layer obtained by applying the crosslinkable composition at 120° C. for 1 hour, and $G_3$ is the Gurley permeability of the porous substrate itself, unit being sec/100 cc.

5. The composite separator of claim 1, wherein the heat-resistant coating layer has a modulus of 0.3 GPa or more at an indentation depth of 50 to 150 nm when the modulus is measured using the nanoindenter.

6. The composite separator of claim 1, wherein the heat-resistant coating layer includes the inorganic particles and the acrylic latex at a weight ratio of 50 to 90:10 to 50.

7. The composite separator of claim 1, wherein the acrylic latex has an average particle diameter of 10 to 300 nm.

8. The composite separator of claim 1, wherein a content of the crosslinking agent is 1 to 30 wt % of a content of the acrylic latex.

9. The composite separator of claim 1, wherein particles of the acrylic latex or an aggregate form of the crosslinkable composition are not observed in the heat-resistant coating layer by the curing.

10. The composite separator of claim 1, wherein the acrylic latex is melted and self-crosslinked with the crosslinking agent at 80° C. to 150° C.

11. The composite separator of claim 1, wherein the inorganic particles have an average particle diameter of 1 μm or less.

12. The composite separator of claim 11, wherein the inorganic particles are boehmite.

13. The composite separator of claim 1, wherein the heat-resistant coating layer has a thickness of 1 to 10 μm.

14. An electrochemical device comprising the composite separator of claim 1.

* * * * *